United States Patent
Scheering

(10) Patent No.: US 7,593,349 B2
(45) Date of Patent: Sep. 22, 2009

(54) METHOD AND ARRANGEMENT FOR CONFIGURATION OF A DEVICE IN A DATA NETWORK

(75) Inventor: Christian Scheering, Bielefeld (DE)

(73) Assignee: Siemens Aktiengesellschaft, Munich (DE)

( * ) Notice: Subject to any disclaimer, the term of this patent is extended or adjusted under 35 U.S.C. 154(b) by 727 days.

(21) Appl. No.: 10/884,485

(22) Filed: Jul. 2, 2004

(65) Prior Publication Data
US 2005/0002342 A1 Jan. 6, 2005

(30) Foreign Application Priority Data
Jul. 2, 2003 (DE) ................. 103 29 858

(51) Int. Cl.
*H04L 12/28* (2006.01)
(52) U.S. Cl. .................. 370/254; 370/349; 709/221; 713/100
(58) Field of Classification Search ........... 370/254, 370/349; 709/220–221; 713/1, 100
See application file for complete search history.

(56) References Cited

U.S. PATENT DOCUMENTS

| 6,009,103 | A * | 12/1999 | Woundy ................. 370/401 |
| 6,374,295 | B2 * | 4/2002 | Farrow et al. ........... 709/223 |
| 6,587,874 | B1 * | 7/2003 | Golla et al. ............. 709/220 |
| 6,629,145 | B1 * | 9/2003 | Pham et al. ............. 709/230 |
| 7,072,337 | B1 * | 7/2006 | Arutyunov et al. ....... 370/389 |
| 2002/0150083 | A1 * | 10/2002 | Fangman et al. ......... 370/352 |
| 2002/0196776 | A1 | 12/2002 | Chiang |
| 2003/0074430 | A1 * | 4/2003 | Gieseke et al. ........... 709/221 |
| 2003/0208609 | A1 * | 11/2003 | Brusca ................... 709/230 |
| 2004/0064520 | A1 * | 4/2004 | Takahashi et al. ........ 709/208 |
| 2004/0268292 | A1 * | 12/2004 | Steeb et al. ............. 717/100 |

OTHER PUBLICATIONS

R. Droms, "Dynamic Host Configuration Protocol", Standards Track, Mar. 1997, pp. 1-14.
S. Alexander and R. Droms, "DHCP Options and BOOTP Vendor Extensions", Standards, Track, Lachman Technology, Inc. and Bucknell University, Oct. 1993, pp. 1-30.

* cited by examiner

*Primary Examiner*—Kevin C Harper
*Assistant Examiner*—Sai-Ming Chan

(57) ABSTRACT

In order to configure a device (EG) in a data network (LAN), an address for an address assignment server (DHCP) is first of all stored in the device (EG). The device (EG) then transmits an inquiry message, which includes a distinguishing data record, to an address assignment server (DHCP). In a further step, as the response to the inquiry message, the address assignment server (DHCP) transmits address information for a parameter server (ADS) associated with the device (EG) to this device (EG), and this address information is stored in a freely useable data field. The device (EG) then uses the address information to produce a connection to the parameter server (ADS). The parameter server (ADS) uses this connection to transmit to the device (EG) parameters which are used for configuration of the device (EG).

20 Claims, 1 Drawing Sheet

METHOD AND ARRANGEMENT FOR CONFIGURATION OF A DEVICE IN A DATA NETWORK

CROSS REFERENCE TO RELATED APPLICATIONS

This application claims priority to the German application No. 10329858.4, filed Jul. 2, 2003 and which is incorporated by reference herein in its entirety.

FIELD OF INVENTION

The invention relates to a method for configuration of a device in a data network, and to an arrangement for configuration of a device in a data network.

BACKGROUND OF INVENTION

In data networks, devices are linked to one another via connections in order to interchange data with one another. With regard to the devices, a distinction is drawn between central devices, for example servers, and end points, for example PCs. End points such as these are frequently also referred to as clients. In general, the devices communicate with one another in data networks on the basis of allocated addresses. When the data is interchanged in a data network on the basis of the Internet Protocol, the addresses which are used are so-called IP addresses (IP=Internet Protocol).

Many data networks, in particular those with a large number of devices, are structured. This is necessary, for example, in order to reduce the network load and to ensure data protection in networks with a large number of branches. For structuring, the data networks are subdivided into logical subareas, which are also referred to as domains. Within one domain, for example, a number of PCs may be allocated to one specific server or to another central device.

One widespread embodiment of the described data networks is speech data networks, which are also referred to as VOIP networks (VOIP=Voice over Internet Protocol). Speech data networks also have central devices, for example gateways, gatekeepers and DNS servers, as well as end points ("clients", "VoIP-clients") which, in speech data networks, may, for example, be in the form of a telephone with a data network connection ("IP phone"), in the form of a multimedia PC, or else in the form of a PC with telephone emulation ("soft phone"). These end points or "clients" are also generally referred to as terminals, by analogy with line-switching telephony.

Before they are used, the devices in data networks must be configured in order to ensure disturbance-free operation. In the case of clients in speech data networks, by way of example, this means that these devices have to be set for the transmission and/or compression protocol ("Codec") which may be used for speech transmission in the data network or data network element, and for the central device which may be used by the respective terminal, that is to say, for example, for the gateway which is allocated to the corresponding appliance, etc. In this case, the IP addresses of the central devices to be used must also be configured in the corresponding terminals, in order that the terminals can communicate with them.

The DHCP method (DHCP=Dynamic Host Configuration Protocol) is known for the configuration of computers (PCs) in data networks (for example: R. Droms, "Dynamic Host Configuration Protocol", Request for comments: 2131, Brucknell University, March, 1997). The DHCP method is implemented with the aid of a central instance in a data network, which generally runs in the form of software on computer hardware and is generally referred to as a "DHCP Server". The method is predominantly used in computer networks in which the availability of useable (free) IP addresses is short, or in those in which a large number of mobile computers are active at different times. In this case, from the limited range of available IP addresses, an IP address is assigned "on loan" only to those computers which are currently connected to the data network ("online"). For this purpose, after being switched on ("booted up"), a computer first of all sets up a connection to the DHCP server, and in the process requests the assignment of a free IP address. The DHCP server then assigns the computer an IP address—generally for a specific validity period—and the IP subnetwork mask that is required in that network segment, and also transmits to the computer the address of a DNS server (Domain Name System server) which can be used in this network segment.

In known data networks, it has been found to be disadvantageous that devices must be configured manually at regular intervals, which is associated with a large amount of labor effort. This is particularly true when an existing configuration has to be changed because, for example, a central device in the corresponding data network has changed its network address, or when central devices are added to the network, or are removed from it. Whenever the association between end points and central devices in the data network is changed, this results in the necessity to change the configuration of the end points in real time.

Although the use of the DHCP method as described above allows the configuration of devices with an IP address, an IP subnetwork mask and with the address of a DNS server, it is, however, possible only to a restricted extent with the known DHCP servers to transmit to the devices (computers) an amount of configuration data which is significantly greater than this "basic configuration". As mentioned above, the clients in speech data networks, in particular, must be supplied not only with the "basic configuration" but also with a large number of other information items (parameters). Furthermore, although the DHCP method is able to assign a newly connected device a free IP address from the range of available free IP addresses, this is not intended to allow, for example, selection of a suitable gateway for a device from a number of gateways in a data network, and to assign this for use.

It is known for the association between end points and central devices (servers) to be updated automatically by the servers in a data network carrying out so-called "scanning" at regular time intervals. The aim of the "scanning" is to find end points which have been added to the network and to send all of the necessary information to these end points in order to configure them for operation in the data network. In this case, each server sends test messages to each address from a specific address range ("address band") and thus checks whether the corresponding addresses have each been allocated to end points. The end points which are found in this process are then supplied with appropriate information, if they have not yet been configured, or have not yet been correctly configured, thus setting them up for operation in the corresponding data network.

With the "scanning method", it has been found to be disadvantageous that the cyclic transmission of a large amount of test messages results in a high network load, to be precise even when only a small number of end points, or none at all, have been added to the data network. Those end points which have been newly added to the data network between two "scanning" processors cannot be used until the next run has been completed. A further disadvantage of this method is that the address structure in the data network must be designed such that the network addresses of the end points that have been added must be matched to the address bands which the corresponding servers search through or, conversely, the address bands must be matched to the addresses being used in the data network.

SUMMARY OF INVENTION

The object on which the invention is based is thus to specify a method and an arrangement to simplify the process of configuration of devices in data networks.

This object is achieved by the claims.

The solution for the method provides for an address of an address assignment server to be stored in the device. The device then transmits an inquiry message to the address assignment server, with the address assignment server transmitting address information for a parameter server to the device, as the response to the inquiry message. The device uses the address information to produce a connection to the parameter server, and the parameter server uses this connection to transmit to the device parameters which are used for configuration of that device. This minimizes the amount of manual effort for configuration of the device. Furthermore, a device is configured in the data network without delay after its initial connection.

The advantages of the arrangement are analogous to the advantages of the method.

The characterizing features of the dependent claims further refine the invention.

The method can be used particularly advantageously in speech data networks, in which speech information is transmitted in data packets based on the Internet Protocol, because devices have to be configured particularly frequently in speech data networks.

If a dynamic host configuration protocol server ("DHCP server") is used as the address assignment server, and is used for assignment of further parameters to the device (EG), with the further parameters comprising the address information for the parameter server (ADS). The DHCP server is normally additionally used for assignment of an Internet Protocol address and a subnetwork mask statement to devices in data networks. The DHCP server thus provides a proven component, which is already in widespread use, for the provision of address information.

Devices in extensive data networks having a number of parameter servers can be started up reliably by storing the Internet Protocol addresses for two or more parameter servers in the address assignment server. A distinguishing data record is then first of all stored in the device and, in a further step, the distinguishing data record is sent to the address assignment server in the inquiry message, and the distinguishing data record is then used to select one of the two or more parameter servers, with the address information from this selected parameter server being transmitted to the device as the response.

A MAC address of a network adapter ("network card") for the device, a user name of a user of the device, a domain name of the domain with which the device is associated, or a call number which is associated with the device is advantageously used as the distinguishing data record. One or more already existing features of the device or of the user is or are thus used to distinguish between that device and other devices. This results in a high degree of flexibility, since the distinguishing data record is stored in the device either by entering the manufacturer, a user or an administrator.

When an Internet address is assigned to the device by means of a DHCP method once it has been started up, the device is basically configured by means of a proven method, which is already used in any case in many data networks. In this case, the known DHCP method in particular offers the advantage that it allows the transmission of short, user-defined additional information (for example: R. Droms/Brucknell University and S. Alexander/Lachman Technology, Inc., "DHCP Options and BOOTP Vendor Extensions", Request for Comments: 1533, October 1993), thus allowing address information for a parameter server to be transmitted in a simple manner.

If the address information for the parameter server is stored in a data field for provider-specific information in the address assignment server, an inquiry for assignment of an Internet Protocol address to the device is used as the inquiry message, and if the assigned Internet Protocol address and the content of the provider-specific information data field are transmitted as the address information for the parameter server to the device as the response, then the transmission of a single inquiry message not only allows the device to be basically configured but also allows the address information for the parameter server, as required for further configuration, to be transmitted.

Exemplary embodiments of the method according to the invention will be explained with reference to the drawings in the following text, and will at the same time be used to explain one exemplary embodiment of the arrangement according to the invention.

DETAILED DESCRIPTION OF INVENTION

Figure 1:
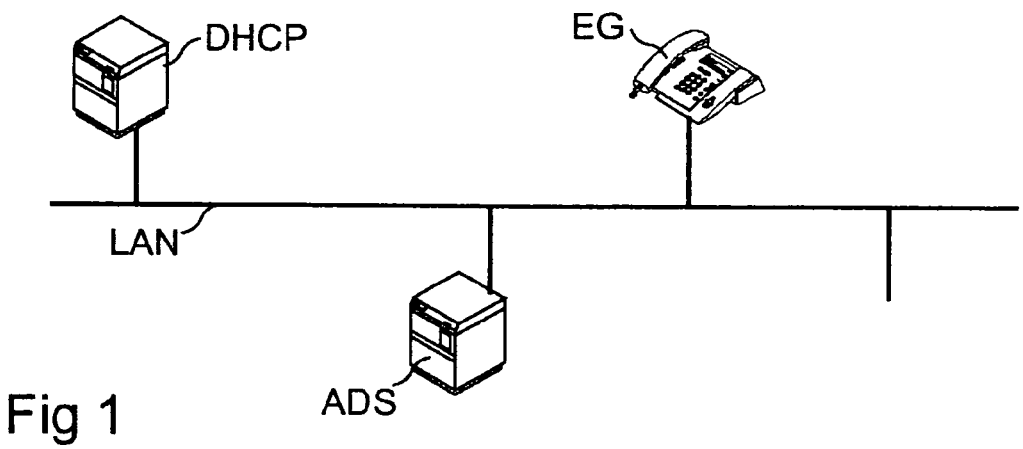
FIG. 1 shows a schematic illustration of a data network having a device, an address assignment server and having a parameter server.

FIG. 1 shows a schematic illustration of a data network LAN in which a device EG, an address assignment server DHCP and a parameter server ADS (Auto Discovery Server) are arranged as components. In principle, the data network LAN can contain further identical components to all of the components, in particular the device EG; however, for reasons of clarity, each of the components is illustrated only once. All of the components in the data network LAN may set up logical connections to other components, and may interchange data with one another via these logical connections.

In this example, the data network LAN is in the form of a speech data network ("VoIP Network"), in which speech terminals ("IP phones") transmit speech information as data packets based on the Internet Protocol. However, other components which are not illustrated here may also be used as the device EG in this case, for example voicemail servers or PCs; the last-mentioned are preferably used by means of hardware and software as an IP phone. Furthermore, in the speech data network which is illustrated by way of example, a gatekeeper and a gateway are provided as central devices, although these central devices are not illustrated in FIG. 1, either. In this case, a gatekeeper is used to control the setting up of connections between terminals EG, and the gateway is the precondition for the capability to set up connections to subscribers who or which are not arranged in the same data network LAN.

In this case, a dynamic host configuration protocol server ("DHCP server") is used as the address assignment server DHCP.

The primary task of an address assignment server DHCP is to allocate an IP address, an IP subnetwork mask and the IP address of a DNS server to devices. Furthermore, to a limited extent, any desired information may be stored in data fields of the address assignment server DHCP, and is transmitted to a device EG on request, that is to say with the aid of an inquiry message. If this comprises a number of data records, the address assignment server DHCP uses the IP address of the device EG to select a specific one of the data records. These data records are also known as "vendor specific information". In situations in which the device EG already has an IP address, this device EG can use a command ("DHCP inform") to check the content of the data record associated with this IP address, in which case a data record such as this may also be associated with a group of IP addresses. If the device EG does not yet have an assigned IP address—which is the case, for example, with newly connected network components—the device EG may use a single command ("DHCP discover") to demand the assignment of an IP address and also to initiate the transmission of the data record associated with this newly connected IP address.

The present exemplary embodiment is based on the assumption that the device EG already has an assigned IP address (which is annotated 196.254.166.228 in FIG. 2) and has an assigned IP subnetwork mask. Furthermore, a DNS server (which is not illustrated here but is used for conversion between IP addresses and domain names) is arranged in the data network LAN. The IP address for the DNS server is also already configured in the device EG.

Figure 2:
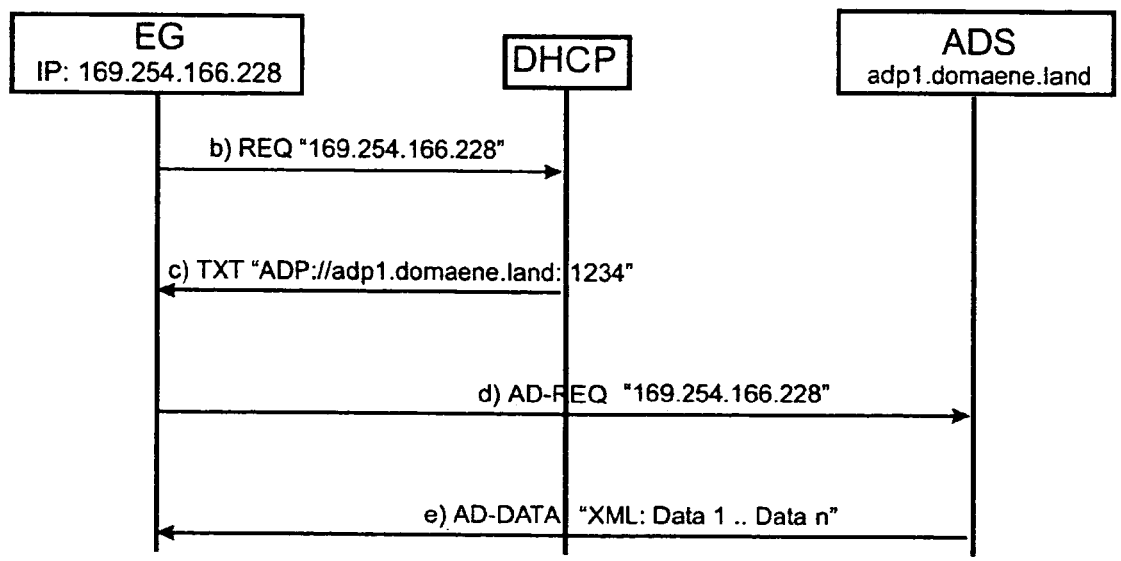
FIG. 2 shows, in a chronological sequence, the messages which are interchanged between the device, the address assignment server and the parameter server.

The major method steps for configuration of the device EG will be explained in the following text, with FIG. 2 showing those steps which relate to the information flow between the components shown in FIG. 1, that is to say the device EG, the address assignment server DHCP and the parameter server ADS. In this case, in addition to the arrows which denote the direction of the information flow, the enumeration characters b) . . . e) are used to show the method steps and the symbolized messages.

In a first step, the IP address of the address assignment server DHCP is stored in the device EG. The address of the address assignment server DHCP is a generally known and used IP address, which is used on the basis of a general convention for addressing of DHCP servers; this address is stored in the device EG at the factory, as a standard address. Other methods are also known for finding and for addressing DHCP servers, but these will not be described any further at this point because they are general prior art.

In the next step b), the device EG sets up a connection to the address assignment server DHCP. The device EG now uses this connection in the step b) to send an inquiry message DHCP inform "169.254.166.228" to the address assignment server DHCP. From its databank, this address assignment server DHCP calls up the "vendor specific information" that is to say a data record which is associated with the IP address which was transmitted with the DHCP inform command. In the present situation, a common data record is stored for all the IP addresses which start with 169.254.166. The content of this data record is a text information item in the form "ADP:// adp1.domaene.land:1234". This text information item is transmitted from the address assignment server DHCP in step c) in the form of a message TXT"ADP://adp1.domaene.land: 1234", which is referred to as a "vendor specific option", to the device EG. This message is evaluated in the device EG, with the prefix "ADP://" indicating that this text message is the address information for a parameter server ADS; the abbreviation ADP stands for "Auto Discovery Protocol".

The device EG is now able to establish a direct connection to the parameter server ADS.

The address information which is transmitted in step c) is a so-called "full qualified domain name", that is to say the text-based form of a network address. A DNS server, which has already been mentioned above, converts this text-based address information to the IP address for the parameter server ADS. Such address conversion of a text-based address to a numerical address has been known for a long time in the prior art, and will not be described in any more detail at this point. The domain name "adp1.domaene.land" in this case represents the address of the computer hardware on which the parameter server ADS is installed in the form of software. However, a number of such instances (and other instances) may be installed on computer hardware, and a so-called TCP (Transmission Control Protocol) port number, in this case ":1234", then indicates the instance which is being specifically addressed on this computer hardware, that is to say the parameter server ADS.

Once the connection to the parameter server ADS has been set up, the device EG sends a further inquiry message AD-REQ "169.254.166.228" to the parameter server ADS. In response to this further inquiry message, the parameter server ADS then, in a final step e), sends to the device EG information which is used for configuration of the device EG. In this case, this information is transmitted in the XML format (Extensible Markup Language), by means of TCP, because the network components in conventional data networks LAN are already equipped to transport TCP messages such as these. A message such as this is in this case set up on the basis of the pattern AD-DATA "XML:Data1 . . . Data n", in which case the introductory root "AD-DATA" identifies this as configuration data. The desired information may, however, also of course be transmitted in some other form.

The received information is now used in the device EG to carry out the required configuration process. This is, for example, the activation of the protocols which can be used in the respective data network LAN for speech compression ("speech codecs"), and other settings.

The invention claimed is:

1. A method for configuration of a device that has completed a basic configuration in a data network, comprising:
    sending an inquiry message from the device to an address assignment server, using a destination address that was stored on the device at a factory as the destination address of the assignment server;
    receiving an inquiry message from the device the address assignment server;
    transmitting destination address information of a parameter server from the address assignment server to the device in response to the inquiry message;
    establishing a connection to the parameter server by the device, using the destination address information of the parameter server transmitted by the address assignment server to establish the connection;
    sending a further inquiry message from the device to the parameter server;
    receiving the further inquiry message from the device by the parameter server; and
    transmitting advanced configuration parameters from the parameter server to the device which are used for an advanced configuration of the device, in response to the further inquiry message.

2. A method as claimed in claim 1, wherein a speech data network in which speech information is transmitted in data packets based on the Internet Protocol is used as the data network.

3. A method as claimed in claim 1, wherein a dynamic host configuration protocol server is used as the address assigned server.

4. A method as claimed in claim 1, wherein a distinguishing data record is transmitted to the address assignment server in the inquiry message, and
wherein the address assignment server uses the transmitted distinguishing data record to select one of a plurality of addresses each pertaining to a parameter server, the selected address transmitted as the address of the parameter server in the response to the inquiry message.

5. A method as claimed in claim 4, wherein a MAC address of a network adapter for the device, a user name of a user of the device, a domain name of the domain with which the device is associated, or a call number which is associated with the device is used as the distinguishing data record.

6. A method as claimed in claim 4, wherein the distinguishing data record is stored by entering manufacturer data, user data or administrator data on the device.

7. A method as claimed in claim 2, wherein the advanced configuration parameters include a codec for use for speech transmission in the data network.

8. An arrangement for configuring a device in a data network, the arrangement comprising:
an address assignment server;
a device having a memory with an address of the address assignment server and a distinguished data record; and
a parameter server in which advanced configuration parameters are stored to be used for advanced configuring of the device, wherein
the data network connects the device, the address assignment server and the parameter server, and the device has already been basically configured for the network, wherein
the device transmits an inquiry message to the address assignment server using the stored address, the inquiry message comprises the distinguishing data record stored in the device, wherein
the address assignment server selects address information pertaining to the parameter server based on the distinguished data record and transmits the address information to the device as a response to the inquiry message, and wherein
the device uses the address information from the assignment server to connect to the parameter server, wherein
the parameter server transmits the advanced configuration parameters to the device.

9. The arrangement as claimed in claim 8, wherein the data network is a speech data network, in which speech information is transmitted in data packets on the basis of the Internet Protocol.

10. The arrangement as claimed in claim 8, wherein the address assignment server is a dynamic host configuration protocol server, which is used for assignment of an Internet Protocol address, of a server network mask statements and further basic configuration parameters to devices in data networks.

11. The arrangement as claimed in claim 8, wherein the distinguishing data record comprises a call number.

12. The arrangement as claimed in claim 8, wherein the distinguishing data record comprises a MAC address of the device.

13. The arrangement as claimed in claim 8, wherein the stored address is stored at a factory.

14. A method for configuration of a device that has been basically configured for a data network, comprising:
sending an inquiry message from the device to an address assignment server, the inquiry message including a predetermined address stored on the device in order to provide a destination address of the inquiry message, the predetermined address comprises an address of the address assignment server;
receiving the inquiry message from the device by the address assignment server;
transmitting an address pertaining to a parameter server in response to the inquiry message, the parameter server address information transmitted from the address assignment server to the device;
establishing a connection to the parameter server by the device, using the parameter server address information transmitted by the address assignment server to establish the connection;
receiving a further inquiry message from the device by the parameter server; and
transmitting an advanced configuration parameter to further configure the device, the transmission in response to the further inquiry message, the advanced configuration parameter comprises a codec, the transmission transmitted from the parameter server to the device.

15. A method as claimed in claim 14,
wherein a distinguishing data record is transmitted to the address assignment server in the inquiry message, and
wherein the address assignment server uses the transmitted distinguishing data record to select one of a plurality of addresses each pertaining to a parameter server, the selected address transmitted as the address of the parameter server in the response to the inquiry message.

16. A method as claimed in claim 15, wherein the predetermined address is stored at a factory.

17. The method as claimed in patent claim 15, wherein the distinguishing data record comprises a call number.

18. The method as claimed in claim 15, wherein the distinguishing data record comprises a MAC address of the device.

19. The method of claim 1, where the advanced configuration parameters are transmitted in Extensible Markup Language (XML) by means of Transmission Control Protocol (TCP).

20. The arrangement of claim 8, where the advanced configuration parameters are transmitted in Extensible Markup Language (XML) by means of Transmission Control Protocol (TCP).

* * * * *